May 18, 1965     H. H. HOEFLER     3,183,651

MOWING APPARATUS

Filed May 22, 1963     3 Sheets-Sheet 1

INVENTOR
*Harry H. Hoefler*

BY *Watts & Fisher*
ATTORNEYS

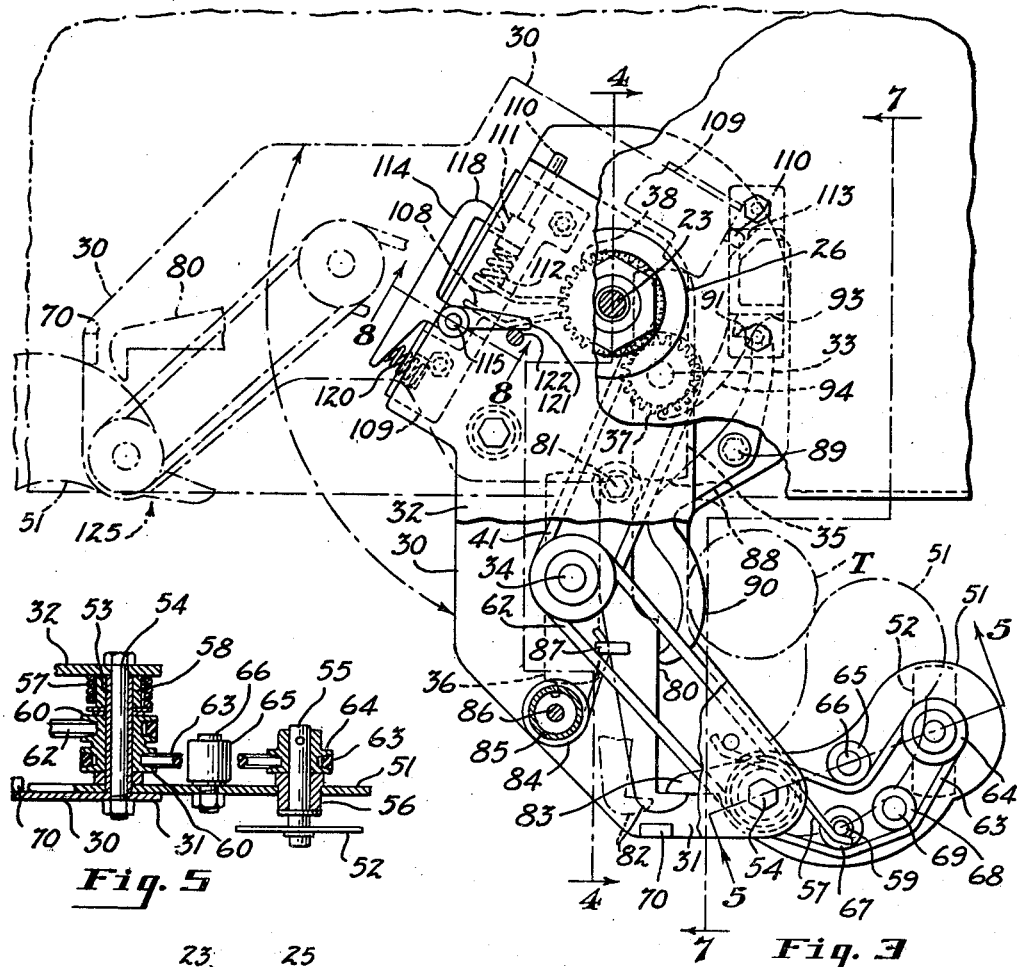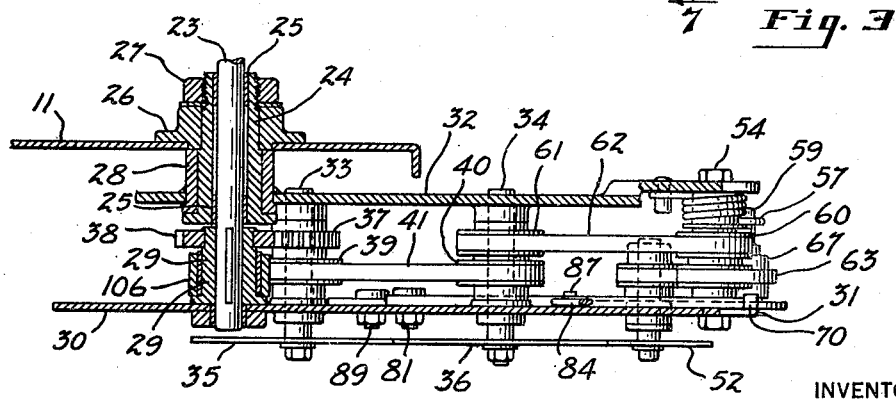

May 18, 1965 H. H. HOEFLER 3,183,651
MOWING APPARATUS
Filed May 22, 1963 3 Sheets-Sheet 3
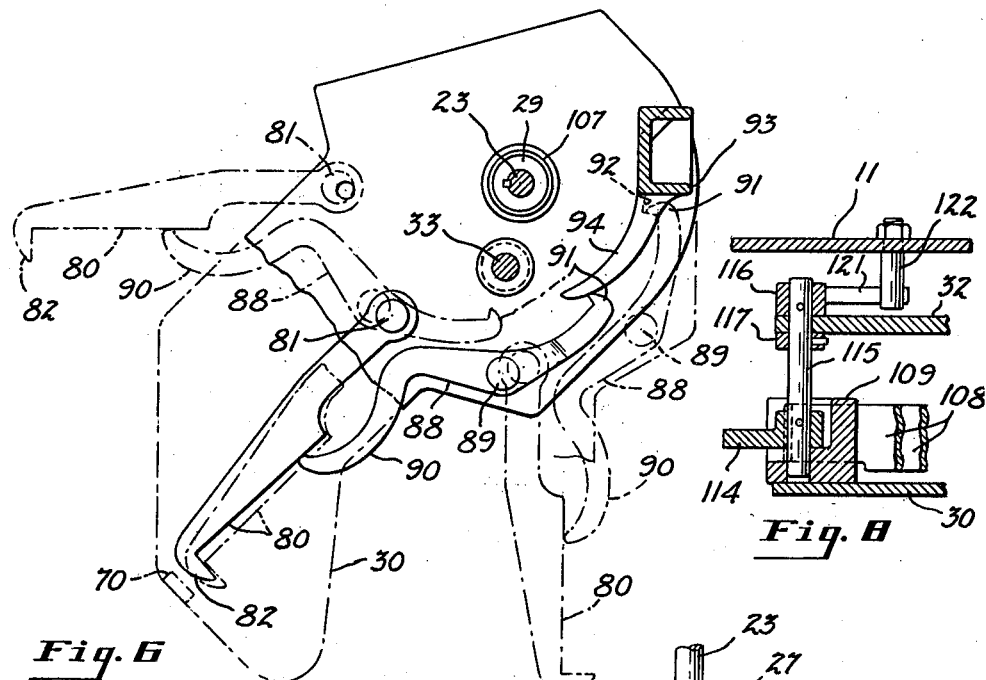
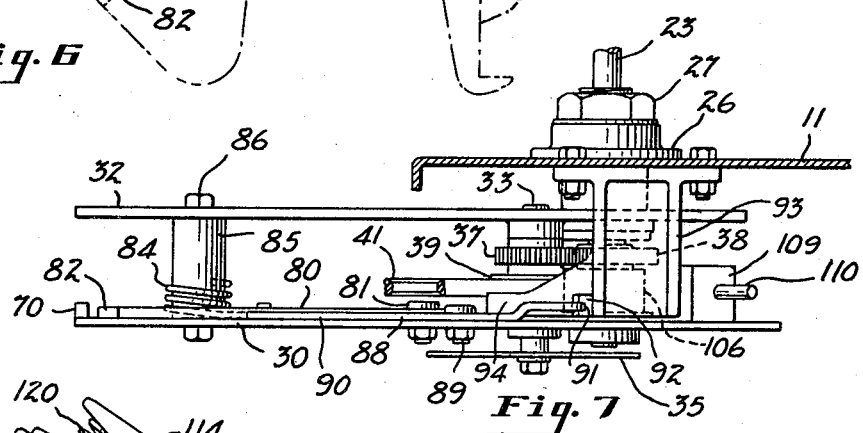
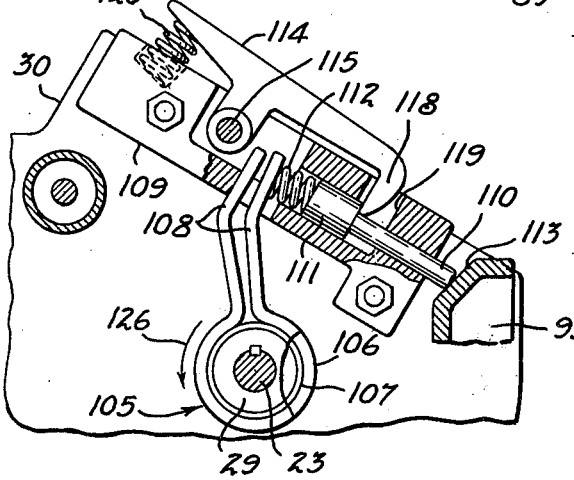
INVENTOR
*Harry H. Hoefler*
BY *Watts & Fisher*
ATTORNEYS

United States Patent Office 3,183,651
Patented May 18, 1965

3,183,651
MOWING APPARATUS
Harry H. Hoefler, 6237 Magnolia Drive, Mentor, Ohio
Filed May 22, 1963, Ser. No. 282,326
13 Claims. (Cl. 56—25.4)

This invention relates generally to mowing apparatus, and more specifically to a new and improved rotary-type lawn mower construction.

A major disadvantage encountered with all known mowers of the type described is the difficulty and awkward manner in which they must be manipulated to cut around trees, posts and the like. In the usual construction, the rotary blade is disposed below the frame of the mower between the wheels. Because of this construction, only a small part of the frame adjacent the ends of the rotating blade can be brought into contact with the tree or post. Hence, in mowing around such an object, it is necessary to manipulate the mower completely around its periphery. In general, such manipulation is difficult and awkward because of the unwieldiness of the usual mower construction. It is especially difficult when the object is relatively small, since in such instances the mower must be turned on a sharp angle.

Further, there are many applications in which the use of conventional mowers is particularly objectionable. One of these applications involves the use of rotary mowers to mow beneath guard rails, fences and the like, such as along the sides of highways. Because of the fact that the guard rails or fence posts are connected to horizontally extending rails which are usually close to the ground, it is frequently impossible to move the mower under the rails in the manner required to cut around the posts. Moreover, since it was impossible to cut completely around the posts and under the rails when moving the mower along one side, it is necessary to mow along both sides of the fence and to turn the mower each time a post is encountered. Such an operation is time-consuming and the results are frequently incomplete or unsatisfactory.

In addition to the above-described difficulties involved in using conventional rotary mowers, another objection is that they are not effective closely to cut around trees and posts. This is because the wheels and the frame of the mower make it impossible to bring the blade closely adjacent the periphery of the object. As a result, a separate hand-trimming operation frequently is required.

An object of the present invention is to provide a mowing apparatus which overcomes the disadvantages of the conventional apparatus described above.

A more specific object of the invention is to provide a new and improved rotary mower which is adapted to mow around trees, posts and the like.

A further object of the invention is to provide a new and improved rotary mowing apparatus as described above which is constructed to mow beneath objects relatively close to the ground, such as the rails of fences and the like.

Another object of the invention is to provide a rotary mower having the advantages described above which can be easily used and handled and which obtains an improved and simplified mowing operation.

In general, the new rotary mower of this invention comprises a wheel-supported frame and one or more rotary blades disposed below the frame and operatively connected to a suitable motor. In addition to the cutting blades beneath the frame, there is provided another cutting blade which is normally spaced from the side of the mower. This normally spaced cutting blade is carried by a tracking arm connected to the frame by a linkage such that the spaced cutting blade can swing around the other blades and about a plurality of axes.

As will hereinafter be described in more detail, a releasable locking structure is included in the preferred construction for holding the tracking arm and its blade spaced from the mower frame. In this locked position, the tracking arm is free to extend below objects relatively close to the ground, such as fence rails, and makes it possible to effect a complete mowing action by moving the mower along only one side of the fence. Also, the provision of the normally extending tracking arm and blade results in a mower construction capable of cutting a wider swath than conventional mowers which usually have a single blade beneath the mower frame. Thus, the novel mower construction comprising the present invention has the advantage of simplifying and improving the mowing operation of conventional apparatus.

When a post or the like is encountered, the locking mechanism is automatically released to permit the tracking arm to pivot and the blade to track around the periphery of the post. This tracking action is obtained while moving the mower in a forward, straight line direction. Thus, the new mower of this invention does not have to be turned around the post or tree as is presently done to effect a trimming operation. The operation can be carried out easily and quickly since manual manipulation of the mower is not required. A further advantage is that the construction of the tracking arm is such that the tracking blade can cut much closer to trees and posts than the usual mowers.

Other objects and advantages of the invention will become apparent from the following detailed description when taken in conjunction with the accompanying drawings.

In the drawings:

FIGURE 3 is a fragmentary plan view of the operative mechanism of apparatus;

FIGURE 4 is a cross-sectional view taken on the line 4—4 of FIG. 3;

FIGURE 5 is a cross-sectional view taken on the line 5—5 of FIG. 3;

FIGURE 6 is a diagrammatical plan view illustrating the releasable locking mechanism of the apparatus;

FIGURE 7 is a cross-sectional view taken on the line 7—7 of FIG. 3;

FIGURE 8 is a cross-sectional view taken on the line 8—8 of FIG. 3; and,

FIGURE 9 is a fragmentary view, partially in cross-section, of a portion of the apparatus.

Figures 1, 2:
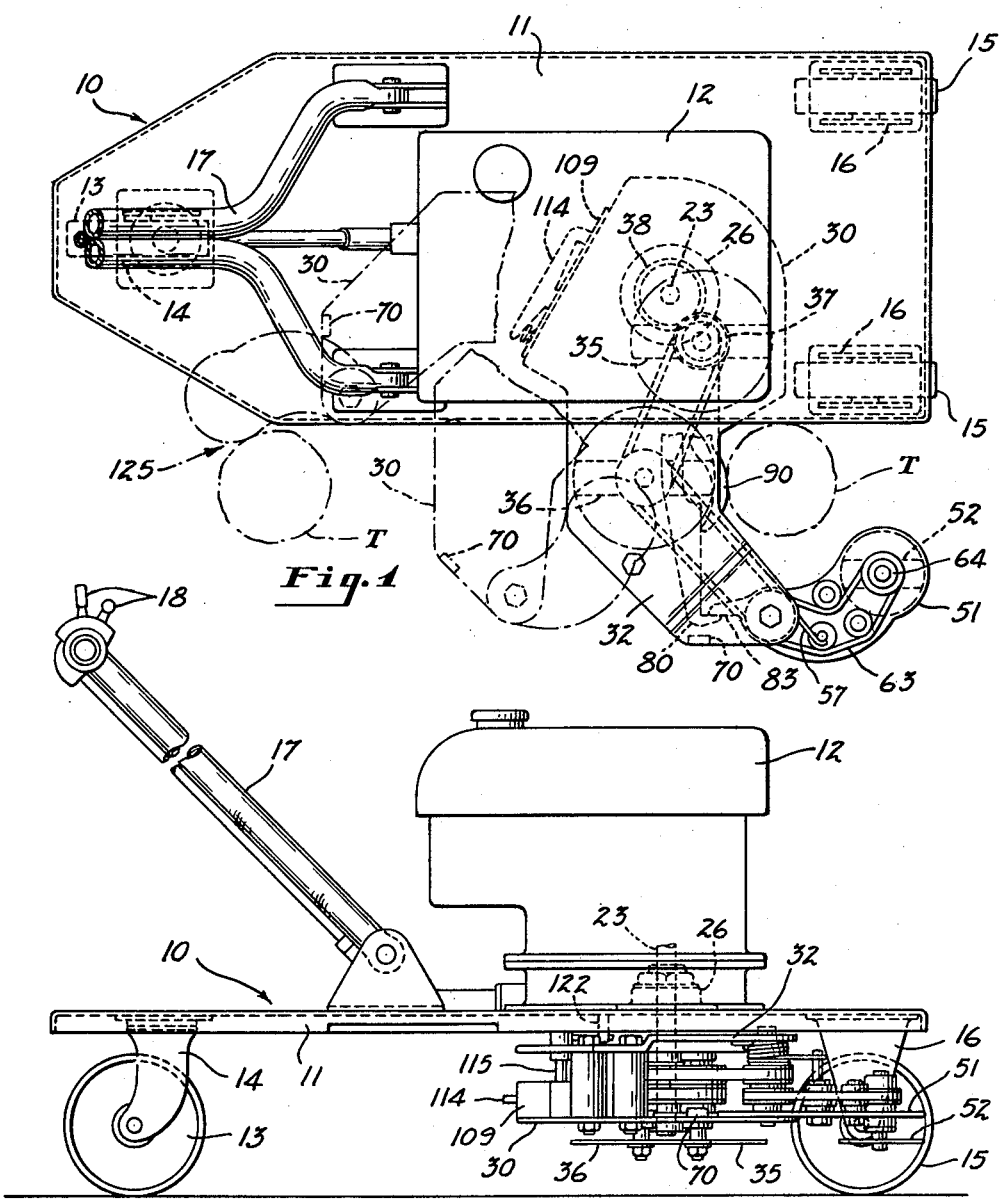
FIGURE 1 is a top plan view of the new and improved mower of this invention and illustrates the manner in which the tracking arm moves around an object during operation.
FIGURE 2 is a side elevational view of the apparatus shown in FIG. 1.

Referring now to the drawings, and to FIGS. 1 and 2 in particular, the new and improved rotary mower is indicated generally by reference numeral 10. In the illustrated embodiment of the invention, the mower 10 comprises a frame 11 on which is mounted a motor 12. The mower is supported by a rear steering wheel 13 which is connected to the frame 11 by a swivel connecting bracket 14, and by spaced front wheels 15 which are carried by suitable wheel mounting brackets 16. A steering handle structure 17 is also connected to the frame, and this handle structure carries the motor controls 18. It will be understod, of course, that the invention can be attached or embodied in a suitable power-driven apparatus, such as a tractor or the like.

As most clearly shown in FIG. 4, the motor drive shaft 23 is journaled in a fixed sleeve 24 by bushings 25. The sleeve 24 extends vertically through a hole in the mower frame 11 and is held in position by a ring 26 and a nut 27.

A collar 28 is rotatably mounted around the fixed sleeve 24 below the frame, and a cylindrical member 29 is fixed to the drive shaft below the sleeve.

A swinging plate 30 is freely mounted on the lower end of the drive shaft 23 and has a distal end 31 normally extending beyond one side of the frame, as shown in FIGS. 1, 3 and 4. In the illustrated embodiment, a second, substantially coextensive plate 32 is secured to the rotatable collar 28 above the plate 30. This freely swinging plate assembly 30, 32 carries a pair of rotatable, spaced cutter blade shafts 33 and 34, and to each of these shafts there is secured a rotary cutter blade 35 and 36, respectively, below the plate 30. The shaft 33 is adjacent the drive shaft 23 and is driven by gears 37 and 38 which are respectively secured to the shaft 33 and to the member 29 on the drive shaft. The cutter blade shafts are in turn connected by a flexible drive comprising a pulley 39 on the shaft 33, a pulley 40 on the shaft 34, and a cooperating belt 41. As will be seen in FIG. 1, the shaft 34 is mounted rearwardly of the shaft 33 so that the blades 35 and 36 will cut intersecting swathes.

In accordance with this invention, a tracking arm 51 is pivotally mounted at the distal end 31 of the swinging plate 30. This tracking arm carries a third rotary cutting blade 52 which is spaced from the side of the mower frame 11 in the normal position of the arm and which is arranged to cut a swath intersecting the swath formed by the blade 36. Referring to FIG. 5, the tracking arm 51 is shown to be mounted by means of a cylinder 53 which is carried on a pin 54 extending between the plates 30 and 32. The blade 52 is fixed on a shaft 55 which is journaled in a sleeve 56. A spring 57 is provided for biasing the pivotally mounted arm 51 toward the side of the mower frame 11. This spring is mounted around a collar 58 which surrounds the cylinder and pin assembly 53, 54 and has one end engaging a roller stud 59 fixed on the tracking arm (FIG. 3).

The mower 10 also includes a flexible drive for the blade 52. In the construction shown, the flexible drive is formed by a double pulley 60 on the cylinder 53 which is connected to a pulley 61 on the blade shaft 34 by a belt 62. A second belt 63 is engaged around the pulley 60 and a cooperating pulley 64 fixed on the blade shaft 55. As shown most clearly in FIG. 3, one flight of the belt 63 is disposed in a curved path and engages a roller 65 which is mounted on a roller stud 66 carried by the tracking arm. The other flight of the belt curves around rollers 67 and 68 which are respectively mounted on the studs 59 and 69.

With the construction thus far described, the swinging plate 30 is free to swing clockwise, as viewed in FIGS. 1 and 3, from the normal position shown by solid lines wherein the plate extends beyond one side of the mower frame to a second position illustrated by broken lines wherein the plate extends substantially rearwardly of the mower beneath its frame. At the same time, the tracking arm 51 may first pivot counterclockwise and then clockwise on the distal end 31 of the swinging plate 30, as illustrated by broken lines in FIG. 1. In this manner, the cutting blade 52 is movable around the blades 35 and 36 and around a plurality of axes defined by the drive shaft 23 and the pin and cylinder assembly 53, 54. During movement of both the swinging plate and the tracking arm, the motor 22 is operable continually to rotate the several cutting blades. A stop member 70 is preferably provided on the end 31 of the plate 30, as shown in FIGS. 1 and 3-5, for limiting pivotal movement of the arm 51 in the second position of the plate 30.

As generally described above, the preferred embodiment of the invention has a releasable locking mechanism adapted to releasably hold the swinging plate 30 in its normal position and to maintain the tracking arm 51 spaced from the mower frame. This locking mechanism includes a latch arm 80 which is pivotally connected to the swinging plate by a bolt 81. The latch arm 80 has a free end 82 which is engageable with a projecting end 83 of the tracking arm to hold the arm against the biasing action of the spring 57. The latch arm is urged into engagement with the tracking arm by a spring 84. As shown in FIGS. 3 and 7, the spring 84 is secured to a spacing cylinder 85 which is mounted by a pin 86 between the plates 30 and 32. One end of the spring 84 is held in engagement with the latch arm 80 by a retainer 87.

The illustrated locking mechanism further includes a lever 88 which is pivotally connected between its ends to the swinging plate 30 by a bolt 89. This lever has a curved end portion 90 which has its terminal end engageable with an intermediate portion of the latch arm 80 and which curves forwardly of the swinging plate in its normal position (FIG. 3). Referring particularly to FIG. 6, the opposite end of the lever 88 is shown to have a cam projection 91 which is engageable in a recess 92 formed in a member 93. The member 93 depends from the mower frame 11 (FIG. 7) and includes a curved cam track 94 which extends from the recess 92.

Taking FIGS. 3 and 6 in conjunction, it will be seen that, in the normal position of the swinging plate 30, the latch arm end 82 is engaged with the end 83 of the tracking arm 51 so as to prevent pivotal movement and hold the cutting blade 52 spaced from the side of the mower. At the same time, the projection 91 of the lever 88 is engaged in the recess 92 to prevent movement of the swinging plate. In operation, the locking mechanism is released by pressing on the curved lever arm end 90 to pivot the lever clockwise. This causes the lever to push the latch arm from engagement with the tracking arm so that it may pivot toward the frame 11 under the action of the spring 57. Simultaneously, the lever projection 91 is disengaged from the recess 92 so that the plate 30 is free to swing toward its second, rearwardly extending position.

When pressure on the lever 88 is released in the rearward position of the tracking arm and swinging plate, the tracking arm 51 and the latch arm 80 will pivot counterclockwise under the action of the springs 57 and 84, respectively, and thus return into cooperative locking engagement. During return movement of the swinging plate 30 to its normal position, the cam projection 91 of the lever will ride on the track 94 into the recess 92 to complete the re-engagement of the releasable locking mechanism.

In accordance with the preferred embodiment of the invention, there is also provided a selectively engageable drive mechanism that is operable to return the swinging plate 30 to its normal position. This selectively engageable drive mechanism is most clearly shown in FIGS. 3, 8 and 9 and includes a slip clutch 105. The slip clutch 105 comprises a metal band 106 which surrounds the cylindrical member 29 on the motor drive shaft 23. If desired, suitable brake material 107 may be provided between the band and the member 29.

The ends 108 of the slip clutch band 106 project into a housing 109 which is fixed on the swinging plate 30. This housing slidably carries an actuator pin having a stem 110 extending from one end of the housing and an enlarged base portion 111. A coil spring 112 is disposed between the base portion 111 and one of the band ends 108. With this arrangement the slip clutch 105 may be engaged by depressing the actuator pin in the housing 109 against the spring 112, thereby forcing the band ends 108 together. Since the ends of the slip clutch band are held in the housing 109, engagement of the slip clutch effectively locks the swinging plate 30 to the motor drive shaft 23 for rotation therewith. The movement of the actuator pin to engage the slip clutch is effected in the second position of the swinging plate. In this position the stem 110 is brought into engagement with an angled surface 113 of the member 93, whereby the pin is depressed in the housing.

In order to lock the slip clutch when it has been engaged, there is provided a locking arm 114 which is fixed on a rotatable shaft 115. As best shown in FIG. 8, the lower end of the shaft 115 is journaled in the housing 109 and the upper end extends through the plate 32. Collars 116 and 117 are fixed to the shaft above and below the plate 32.

The locking arm 114 has a projecting end 118 adapted to extend through a hole 119 in the housing 109 so as to engage the enlarged base 111 of the actuator pin when it has been depressed to operatively engage the slip clutch. The arm 114 is urged into this locking position by a coil spring 120 disposed between the housing 109 and the end of the locking arm opposite the projecting end 118. Because of this construction, the slip clutch 105 will be held engaged by the locking arm so that the swinging plate can be rotated by the motor drive shaft 23 from the second, broken line position illustrated in FIG. 3 to illustrated solid line or normal position.

In order to disengage the slip clutch 105 after return movement of the swinging plate, a release arm 121 is connected to the shaft collar 116 (FIG. 8). This release arm extends laterally from the shaft 115 and is adapted to engage a pin 122 which is secured to the mower frame 11. When the swinging plate is returned to its normal position, the arm 121 engages the pin 122 and rotates the shaft 115. This causes the locking arm 114 to pivot away from the actuator pin base 111 so that the clutch 105 is operatively disengaged.

The operation of the novel mower will be largely apparent from the foregoing description. In summary, the normal position of the mower is such that the swinging plate 30 extends laterally beyond the frame with the blade 52 on the tracking arm 51 spaced from the side of the mower. The locking mechanism comprising the latch arm 80 and the lever 88 serve releasably to hold the tracking arm and swinging plate in the normal position wherein the several blades 35, 36 and 52 are arranged to cut a continuous, wide swath during movement of the mower.

When an obstacle T (FIG. 1), such as a tree or a post or the like, is encountered, the mower is moved to engage the obstacle against the curved end portion 90 of the lever 88 between the tracking arm 51 and the side of the mower frame. This engagement releases the locking mechanism 80, 88 to permit the tracking arm to be pivotally biased against the periphery of the obstacle. Continued forward movement of the mower causes the plate 30 to be pushed or swung rearwardly, while the tracking arm is maintained in engagement with the obstacle by the spring 57.

As the plate 30 swings rearwardly, the arm 51 simultaneously pivots clockwise (as viewed in FIG. 1) as it is pushed past the obstacle and thus tracks around its periphery approximately 180° until the arm and plate are substantially in the broken line position indicated in FIG. 1 by reference character 125. In approximately this position, the arm 51 contacts the stop 70 so that the arm can no longer pivot clockwise relative to the plate 30. Consequently, the arm 51 and the plate 30 will move as a unit until the stem 110 of the slip clutch actuator pin contacts the surface 113 of the member 93 to engage the slip clutch 105 and operatively connect the swinging plate to the motor drive shaft 23. With the slip clutch engaged, the plate 30 is driven by the motor in the direction of arrow 126 in FIG. 9, while the arm 51 now pivots counterclockwise under the action of the spring 57 to maintain contact with the obstacle T. This tracking motion of the arm 51 continues until the blade 52 finally passes out of engagement with the obstacle due to the continued forward movement of the mower, whereupon the plate 30 and the arm 51 are automatically returned to their original position and again locked by the releasable locking mechanism.

The angle and extent of the arcuate tracking movement of the arm 51 depends upon the size of the obstacle T and usually varies from about 300° to about 360°. When the object encountered is of relatively large size, such as shown in FIG. 1, the mower easily can be angled or turned a small amount completely to trim around the object. Such turning of the mower is not required when trimming around smaller objects, such as fence posts and the like, since the action of the tracking arm itself and of the swinging plate is sufficient to effect a 360° tracking path of the blade 52.

It will be apparent from the foregoing that the invention provides a rotary mower capable of easily and quickly cutting around objects encountered in its path of travel. As explained, the cutting action can be obtained with either none or very little manipulation of the mower itself, depending upon the size of the object. Further, the mower of this invention is able to cut closer to the various objects encountered than prior art mower constructions because of the fact that the cutting is accomplished with a relatively small arm and blade. This construction avoids the necessity of engaging the object with the wheels and bulky frame portions of the mower which would hold the cutting blades away from the object. In addition, the extension of the tracking arm is such that the mower can be used to cut beneath fence rails or the like.

Another advantage of the invention is that it can cut around objects of different cross-sectional configurations and sizes, as for example, square fence posts, large trees, small metal posts and the like. This advantageous operation is achieved through the novel arrangement of the tracking arm 51 so that it is free to swing about a plurality of axes and thereby maintain engagement with the object.

Many modifications and variations of the invention will be apparent to those skilled in the art in view of the foregoing detailed description. Therefore, it is to be understood that, within the scope of the appended claims, the invention can be practiced otherwise than as specifically shown and described.

I claim:

1. Cutting apparatus for cutting around obstacles such as posts, trees and the like, said apparatus comprising:
   (a) a wheel supported frame,
   (b) a motor mounted on said frame,
   (c) a first cutting member carried below said frame,
   (d) a second cutting member having a normal position spaced beyond one side of said frame in which said second cutting member is engageable with the far side of an obstacle encountered during forward movement of said apparatus,
   (e) linkage means connecting said second cutting member to said frame for horizontal swinging movement about a plurality of spaced, vertical axes from its normal position to a second, rearward position while in engagement with the far side of the obstacle,
   (f) drive means connecting said motor to said first and second cutting members,
   (g) selectively engageable means operatively connecting said motor to said linkage means in the second position of said second cutting member to return it to said normal position while in engagement with the rear side of the obstacle; and,
   (h) means interconnecting said linkage means and releasably locking it against swinging movement when said cutting member is in its normal position, said means locking said linkage means being releasable when the object is engaged between said second cutting member and said frame.

2. The cutting apparatus as claimed in claim 1 wherein said selectively engageable means comprises slip clutch means associated with said motor and means on said linkage means for engaging said slip clutch means in said second position, and wherein said apparatus further includes means for disengaging said slip clutch means in said normal position.

3. A rotary mower comprising:
   (a) a wheel supported frame, (b) a motor mounted on said frame, (c) cutting means normally spaced beyond one side of said frame, (d) means connecting said cutting means to said frame, (e) said connecting means including a first member connected to said frame for horizontal swinging movement and a second member connected to a distal end of said first member for pivotal movement in a horizontal plane, (f) said cutting means being carried by said second member, (g) releasable locking means carried by said frame and said connecting means for holding said cutting means in its normal position, said locking means being releasable to permit arcuate movement of said cutting means to a second position, (h) flexible drive means connecting said motor to said cutting means, (i) selectively engageable drive means between said motor and said connecting means for returning said cutting means to said normal position, and (j) means carried by said frame for actuating said selectively engageable drive means in the second position of said cutting means.

4. A rotary mower comprising:
   (a) a wheel supported frame,
   (b) a swinging plate carried by said frame and having a distal end normally extending beyond one side thereof,
   (c) a tracking arm pivotally connected to said distal end for movement toward and away from said side of said frame,
   (d) biasing means acting between said swinging plate and said tracking arm to urge it toward said side of said frame in the normal position of said swinging plate,
   (e) releasable locking means on said frame and said swinging plate, said locking means including lever means simultaneously holding said tracking arm spaced from said one side of said frame,
   (f) cutter means carried by said swinging plate and said tracking arm,
   (g) motor drive means mounted on said frame in driving connection with said cutter means, and
   (h) selectively engageable drive means between said motor drive means and said swinging plate, said selectively engageable drive means being engageable in the second position of said swinging plate, whereby said plate is drivingly returned to its normal position.

5. The rotary mower as claimed in claim 4 wherein said selectively engageable drive means includes a slip clutch, and means carried by said swinging plate for lockingly engaging said slip clutch to said motor drive means.

6. A rotary mower comprising:
   (a) a frame,
   (b) wheels supporting said frame,
   (c) a drive shaft extending downwardly through said frame,
   (d) a motor mounted on said frame and connected to said drive shaft,
   (e) a swinging plate mounted below said frame, said plate having a distal end normally extending beyond one side of said frame,
   (f) a rotary cutter blade carried by said swinging plate,
   (g) means drivingly connecting said blade to said drive shaft,
   (h) a tracking arm pivotally connected to the distal end of said swinging plate,
   (i) another cutter blade carried by said tracking arm,
   (j) flexible drive means connecting all of said blades,
   (k) means biasing said tracking arm for pivotal movement toward said frame,
   (l) selectively engageable drive means for drivingly connecting said drive shaft to said swinging plate,
   (m) means carried by said frame for actuating said selectively engageable drive means in the second position of said swinging plate, whereby said swinging plate is returned to its normal position, and
   (n) means carried by said frame for disengaging said selectively engageable drive means in the normal position of said swinging plate.

7. The rotary mower as claimed in claim 6 including releasable locking means comprising a latching member pivotally mounted on said swinging plate, means biasing said latching member into engagement with said tracking arm, and lever means pivotally connected to said swinging plate, said lever means having a portion engageable with said latching member to cause disengagement of said tracking arm and another portion engageable with said frame to releasably hold said swinging plate in its normal position.

8. A rotary mower comprising:
   (a) a frame,
   (b) wheels supporting said frame,
   (c) a drive shaft extending downwardly through said frame,
   (d) a motor mounted on said frame and connected to said drive shaft,
   (e) a swinging plate freely mounted on said drive shaft below said frame, said swinging plate having a distal end normally extending beyond one side of said frame,
   (f) a first blade shaft rotatably carried by said swinging plate adjacent and parallel to said drive shaft,
   (g) a first rotary cutter blade connected to said first blade shaft below said swinging plate,
   (h) gear means drivingly interconecting said drive shaft and said first blade shaft,
   (i) a second blade shaft rotatably carried by said swinging plate, said second blade shaft being spaced laterally of said first blade shaft when said swinging plate is in its normal position,
   (j) a second rotary cutter blade connected to said second cutter shaft below said frame,
   (k) a tracking arm pivotally connected to the distal end of said swinging plate,
   (l) a third cutter shaft rotatably carried by said tracking arm,
   (m) a third rotary cutter blade connected to said third cutter shaft,
   (n) means drivingly interconnecting said first, second and third cutter shafts,
   (o) means biasing said tracking arm for pivotal movement toward said frame,
   (p) releasable locking means carried by said frame and swinging plate, said locking means including means to releasably hold said swinging plate in its normal position and means releasably engageable with said tracking arm to maintain said third cutter blade spaced from said one side of said frame, said locking means being releasable to permit pivotal movement of said tracking arm and movement of said swinging plate around said drive shaft opposite to its direction of rotation to a second position,
   (q) a slip clutch mounted around said drive shaft,
   (r) slip cltuch locking means carried by said swinging plate, said slip clutch locking means including actuating means for engaging said slip clutch in said second position of said swinging plate, whereby said swinging plate is driven by said drive shaft to said normal position, and
   (s) releasing means connected to said frame for disengaging said slip clutch locking means in the normal position of said swinging plate.

9. The rotary mower as claimed in claim 8 wherein said releasable locking means comprises a latch arm pivotally mounted on said swinging plate, said latch arm having a free end engageable with said tracking arm in the normal position of said swinging plate, and means urging said latching arm and tracking arm into engagement.

10. The rotary mower as claimed in claim 9 wherein said releasable locking means further comprises a lever pivotally connected between its ends to said swinging plate, lever engaging means carried by said frame, said lever arm having one end contiguous to said latch arm and its other end held by said lever-engaging means when said swinging plate is in its normal position, said locking means being releasable by pivoting said one end against said latch arm.

11. The rotary mower as claimed in claim 8 wherein said slip clutch comprises a band having end portions projecting laterally of said drive shaft, and wherein said slip clutch locking means comprises a pivotally mounted locking arm, said locking arm having one end operatively engageable with an end portion of said band to lockingly engage said slip clutch, and spring means urging said one end of said locking arm into operative engagement with said end portion, said locking arm being engageable by said releasing means to pivot said one end against said spring means.

12. Mowing apparatus for cutting around obstacles such as posts, trees and the like, said apparatus comprising:
(a) a wheel supported frame,
(b) power means connected to said frame,
(c) blade means for cutting around the periphery of an obstacle in the path of movement of said apparatus,
(d) linkage means connecting said blade means to said frame for horizontal swinging movement about a plurality of spaced, vertical axes so that said blade means is adapted to mow first around the far side of the obstacle and then around its rear and near side while said apparatus is moved in a forward, straight line direction;
(e) said linkage means including a first member having a normal laterally extending position, a tracking member carrying said blade means, and means pivotally connecting said members so that the obstacle is engageable between said frame and said blade means,
(f) releasable locking means normally preventing pivotal movement of said tracking member, said locking means being releasable when an object is engaged between said blade means and said frame so that said tracking member is movable to engage said blade means against the obstacle while continued forward movement of said apparatus causes said first member to be swung to a rearward position, and
(g) means interconnecting said first member to said power means in said rearward position, whereby said first member is returned to its normal position while said blade means is maintained in engagement with the near side of the obstacle.

13. The apparatus as claimed in claim 12 including another blade means carried by said linkage means for horizontal swinging movement about a vertical axis.

References Cited by the Examiner
UNITED STATES PATENTS

| | | | |
|---|---|---|---|
| 2,489,633 | 11/49 | Fulgham | 172—5 |
| 2,976,664 | 3/61 | Monroe | 56—25.4 |
| 3,045,413 | 7/62 | Sheffer | 56—25.4 |
| 3,095,045 | 6/63 | Ennis et al. | 56—25.4 |

T. GRAHAM CRAVER, *Primary Examiner.*

CARL W. ROBINSON, RUSSELL R. KINSEY,
*Examiners.*